US007896309B1

(12) United States Patent
DiGiammo

(10) Patent No.: US 7,896,309 B1
(45) Date of Patent: Mar. 1, 2011

(54) MAGNETIC ALIGNMENT TOOL FOR FOAM INSERTS CONTAINED WITHIN PRECAST WALL PANELS

(76) Inventor: Nicholas DiGiammo, Rehoboth, MA (US)

( * ) Notice: Subject to any disclaimer, the term of this patent is extended or adjusted under 35 U.S.C. 154(b) by 1133 days.

(21) Appl. No.: 11/511,906

(22) Filed: Aug. 29, 2006

Related U.S. Application Data

(60) Provisional application No. 60/815,928, filed on Jun. 24, 2006.

(51) Int. Cl.
*A47G 29/00* (2006.01)
*F16B 35/04* (2006.01)
*B22D 19/00* (2006.01)

(52) U.S. Cl. ........... 249/205; 249/83; 248/684; 248/686; 24/303; 411/425

(58) Field of Classification Search .................... 249/83, 249/85, 205; 411/425; 248/684, 686, 690; 24/303
See application file for complete search history.

(56) References Cited

U.S. PATENT DOCUMENTS 5,274,889 A * 1/1994 Morita ............................ 24/303
6,978,521 B2 * 12/2005 Morita ............................ 24/303

* cited by examiner

*Primary Examiner* — Michael Safavi

(57) ABSTRACT

The alignment tool of the present invention includes a cylindrical coil extending outward from one side of a steel base plate. The opposite side of the base plate includes a raised center lip portion for alignment and placement of a magnet thereon. The magnet includes a partially magnetic steel form attachment surface. The alignment tool cylindrical coil is screwed into a foam panel leaving the partially magnetic side exposed and substantially flush with a foam panel side. One or more alignment tools may be secured to a foam panel depending on the dimensions of the panel. The foam panels are then placed in a concrete form with the alignment tool partially magnetic side attaching to a concrete form steel member. The alignment tool keeps the foam panel secured and stable within the form while the form is being filled with concrete.

10 Claims, 7 Drawing Sheets

MAGNETIC ALIGNMENT TOOL FOR FOAM INSERTS CONTAINED WITHIN PRECAST WALL PANELS

CROSS-REFERENCE TO RELATED APPLICATIONS

This application claims the benefit of U.S. Provisional Application No. 60/815,928 filed 24 Jun. 2006.

BACKGROUND OF THE INVENTION

1. Field of the Invention

The present invention relates, in general, to concrete form systems. More particularly, the present invention relates to an alignment tool for positioning foam inserts within a concrete form prior to and during the concrete pouring process.

2. Description of the Prior Art

It is well-known in the construction industry to use concrete form systems to provide forms for pouring concrete in desired shapes, such as walls, stairs, sides of tanks, etc. Such concrete form systems are often made of a plurality of gang forms. A gang form is conventionally made of several form panels attached together at their edges until a surface of the desired dimensions is achieved. The form panels may be made of wood, metal, or other substances that provide the requisite flat surface and strength to bear the load placed on them by the poured concrete. Modern concrete forming materials now include foam inserts to lighten the weight of precast wall panels while providing insulative properties. Foam inserts are provided as part of the forming materials used to pre-cast concrete walls. A common problem encountered when utilizing foam inserts within a concrete form is keeping the insert positioned while the concrete is poured into the form. The resulting difficulties encountered by the construction workers renders this particular task rather labor intensive and time consuming.

SUMMARY OF THE INVENTION

It is an object of this invention to provide an alignment tool that is inserted within a foam panel and includes a magnet which attaches the foam panel to a form member thereby ensuring the foam member stays positioned within the concrete form during the concrete pouring process.

It is another object of this invention to provide a reusable alignment tool.

It is another object of this invention to reduce the time required to construct precast concrete panels, by eliminating the need for workers to hold foam panels in place during the concrete pouring process.

It is another object of this invention to accomplish the foregoing by the use of an alignment tool of this invention which can be easily and inexpensively manufactured.

Broader aspects of the invention and devices within the scope of the same will become clearer from a further reading of the specification and claims and a consideration of the drawings. These and other objects will become apparent upon a reading of the following Specification and Claims in which a Magnetic Alignment Tool For Foam Inserts is disclosed for keeping a foam insert positioned within a concrete form during the period concrete is poured into the form.

The alignment tool of the present invention comprises a cylindrical coil extending outward from one side of a steel base plate. The opposite side of the base plate includes a raised center lip portion for alignment and placement of a magnet thereon. The magnet includes a partially magnetic steel form attachment surface. The alignment tool cylindrical coil is screwed into a foam panel leaving the partially magnetic side exposed and substantially flush with a foam panel side. One or more alignment tools may be secured to a foam panel depending on the dimensions of the panel. The foam panels are then placed in a concrete form with the alignment tool partially magnetic side attaching to a concrete form steel member. The alignment tool keeps the foam panel secured and stable within the form while the form is being filled with concrete. After the concrete is poured and has cured the precast concrete enveloping the foam panel is separated from the form. The partially magnetic side of the foam panel easily detaches from the steel form member without damaging the foam panel and the alignment tool can now be unscrewed from the foam panel. The precast concrete is next turned over and the side containing the alignment tool is next filled with concrete to complete the precast concrete structure.

BRIEF DESCRIPTION OF THE DRAWINGS

The invention is best understood from the following detailed description when read in connection with the accompanying drawings, which illustrate an embodiment of the present invention.

DETAILED DESCRIPTION OF THE INVENTION

Figure 1:
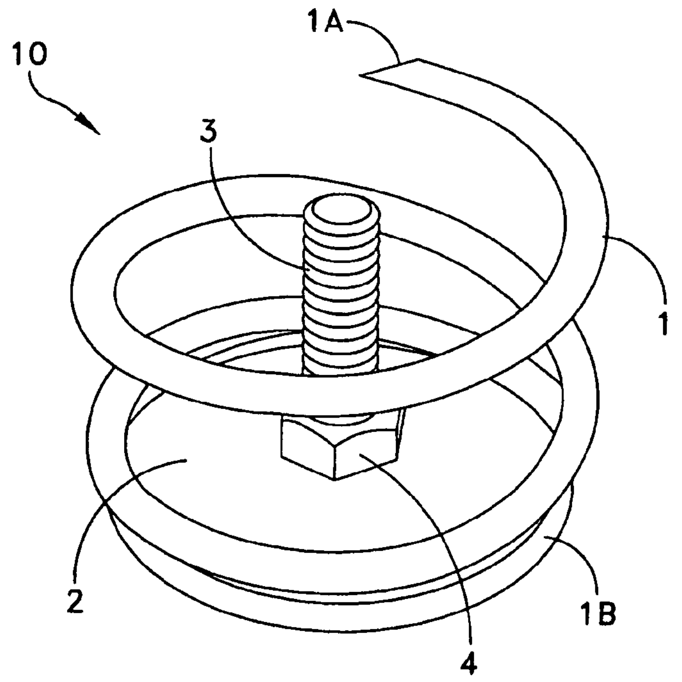
FIG. 1 illustrates a bottom view of the present invention.

It should be understood that the following is a detailed description of the invention and that numerous changes to the disclosed embodiments can be made in accordance with the disclosure herein without departing from the spirit or scope of the invention. Rather, the scope of the invention is to be determined only by the appended claims and their equivalents.

FIGS. 1 through 8 illustrate the magnetic alignment tool 10 of the subject invention. The tool 10 comprises a cylindrical coil 1 with end 1A and end 1B secured to a steel baseplate 2. End 1A may be sharpened or pointed to facilitate boring into a foam material 6 such as STYROFOAM or the like. Cylindrical coil 1 may be made from any sufficiently rigid material or composite such as steel or the like. The material is chosen such that the coil 1 will retain its shape upon multiple uses. The diameter of the coil 1 and baseplate 2 can be varied according to a particular application. Also the number of turns of coil 1 or the "turn density" may be increased or decreased to achieve different gripping forces of coil 1 when bored into foam 6 or the like.

Figure 2A:
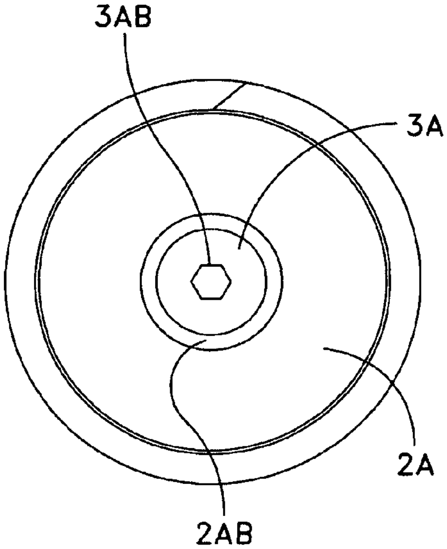
FIGS. 2 A and 2B illustrates a top view of the present invention shown with detached cylindrical magnet portion 5.
Figure 2B:
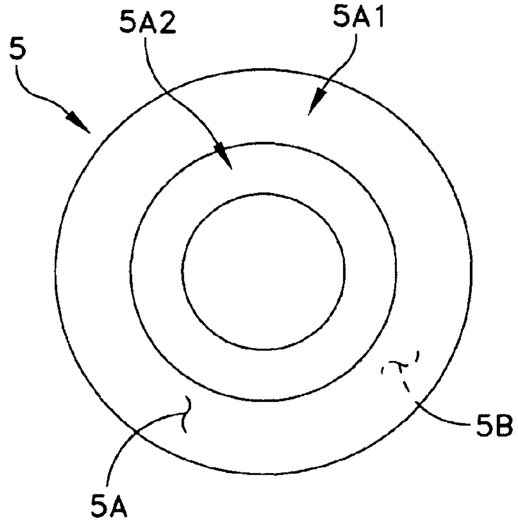
Figure 3:
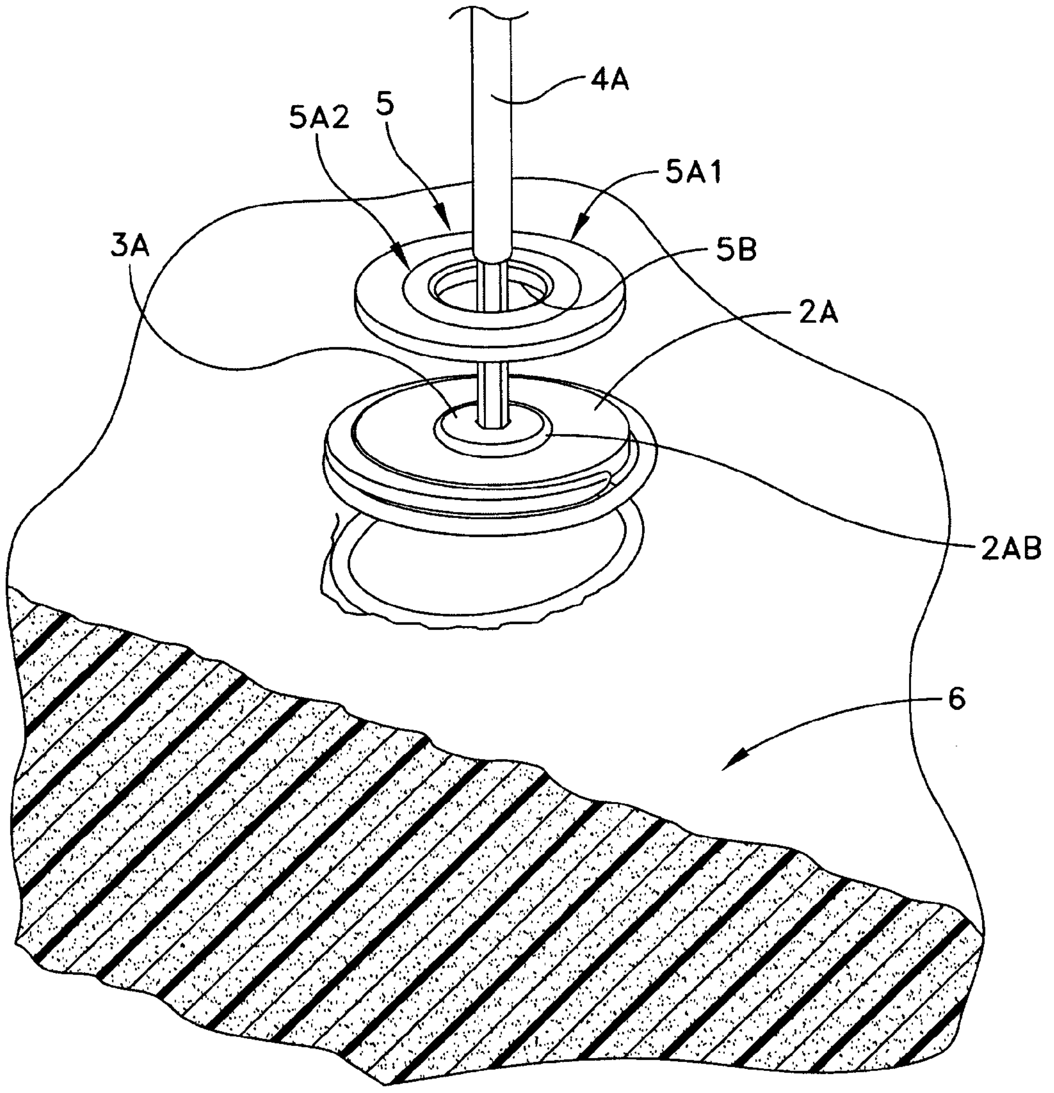
FIG. 3 illustrates a perspective view of subject invention being bored into a foam panel 6 by an alien wrench 4A and shown with detached cylindrical magnet portion 5.
Figure 3A:
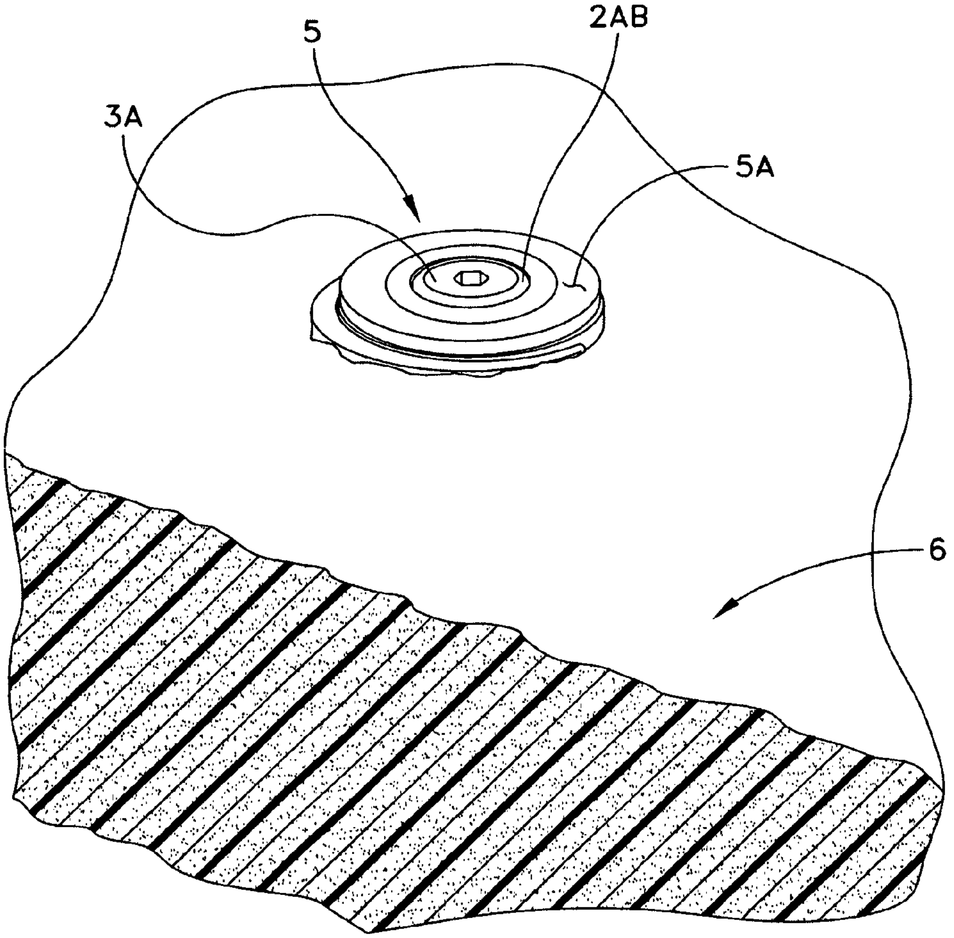
FIG. 3A illustrates the invention of FIG. 3 with attached cylindrical magnet portion 5 after being bored into foam panel 6, and ready for use.

Referring to FIGS. 3 and 3A, magnetic alignment tool 10 is illustrated after being inserted or bored within a piece of foam 6. FIG. 3A illustrates the invention assembled and in place after installation. For illustrative purposes, FIGS. 2A, 2B and 3 shows magnet 5 separated from the alignment tool 10.

Figure 4:
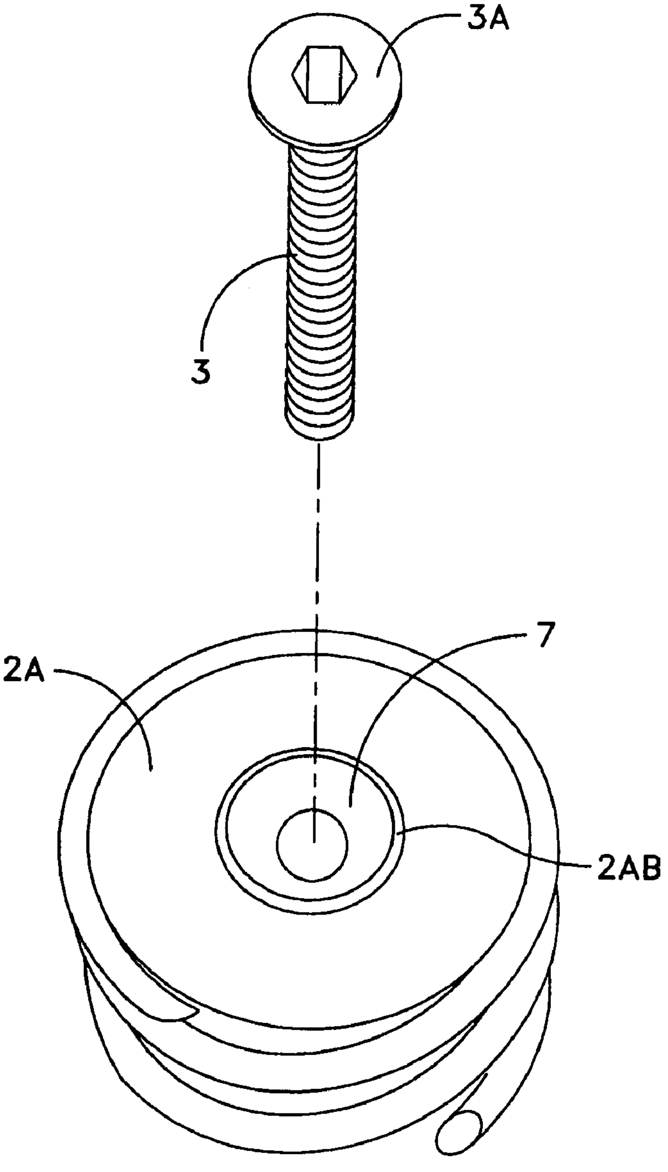
FIG. 4 illustrates a top view of subject invention with detached cylindrical magnet portion 5 and detached threaded screw 3.

When in use, magnet 5 is attached to baseplate top surface 2A as illustrated in FIGS. 3 and 3A. Base Plate top surface 2A includes a concentric top surface raised center lip portion 2AB with the top of said lip being substantially flush with threaded screw head 3A. Threaded screw head further includes an allen wrench opening 3AB. Referring to FIGS. 1 through 3, threaded screw 3 is secured by locking nut 4 such that turning alien wrench 4A in a clockwise direction would cause cylindrical coil 1 to bore into foam 6. Referring to FIG. 4, screw head 3A is countersunk within an interior concave extension 7 extending inward from the top surface of raised center lip portion 2AB. It is understood that the primary purpose of threaded screw 3 is to provide a means for turning or boring magnetic alignment tool into foam 6 in a clockwise direction via alien wrench 4A. It is understood that other suitable means may be employed to accomplish this same result. For example, raised center lip portion 2AB may be a one piece solid or integrally molded surface that includes an allen wrench opening to facilitate turning of the magnetic alignment tool 10.

Referring to FIGS. 2A, 2B, 3, and 3A cylindrical magnet 5 bottom surface 5B is fully magnetic and magnetically attaches to and covers the surface of Base plate top surface 2A for tool 10, as illustrated in FIGS. 3 and 3A. When assembled, the raised center lip 2AB extends through the center of magnet 5 and is substantially the same thickness as magnet 5, as illustrated in FIG. 3A. The top surface of center lip 2AB is coplaner to magnetic top surface 5A, as illustrated in FIG. 3A. Magnet 5 top surface 5A includes both a fully magnetic surface 5A2 and a partially magnetic surface 5A1, with surfaces 5A2 and 5A1 being substantially coplanar with each other. Surface 5A1 is wrapped with an insulative material such that the overall magnetic gripping force of surface area 5A1 would be reduced or eliminated depending on the application. Magnetic surfaces 5A1 and 5A2 would attach to a steel concrete form resting thereon. The magnetic strength of surface 5A1 is reduced therefore reducing the total magnetic hold of top surface 5A. This would ensure that an attached concrete form would be easily separable from the magnet top surface 5A such that the pulling of the form would not cause the cylindrical coil 1 to rip through the foam 6. Magnet 5 may be constructed in any way known in the art such that the magnetic strength of bottom surface 5B is greater than the magnetic strength of top surface 5A to achieve the results as previously disclosed herein. For example, two dissimilar strength magnets could be mated together to achieve the same result of providing a magnet top surface with a reduced strength. The magnetic strength of bottom surface 5B is chosen such that bottom surface 5B will remain attached to base plate top surface 2A when an attached concrete form is separated from the magnet top surface 5A.

Figure 5:
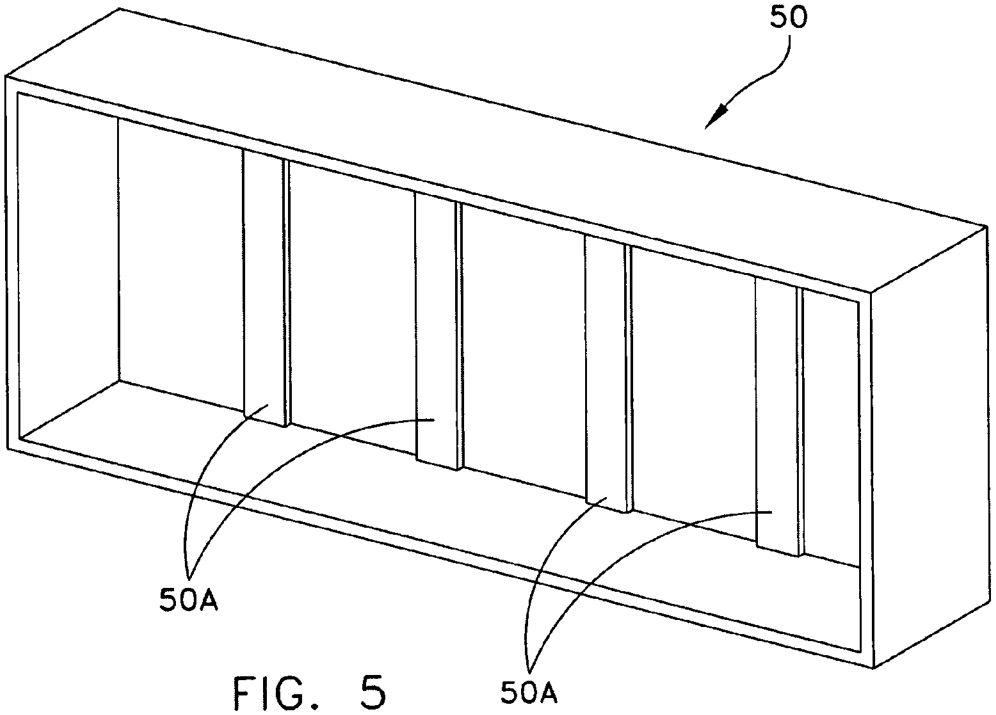
FIG. 5 illustrates a steel form in which the invention of FIG. 1 is utilized.
Figure 6:
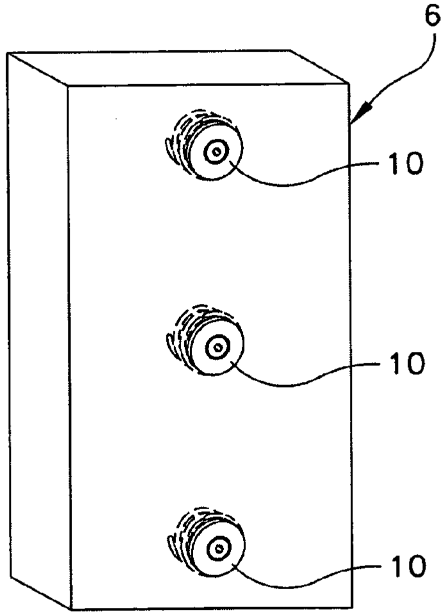
FIG. 6 illustrates the invention of FIG. 1 placed within a foam panel.
Figure 7:
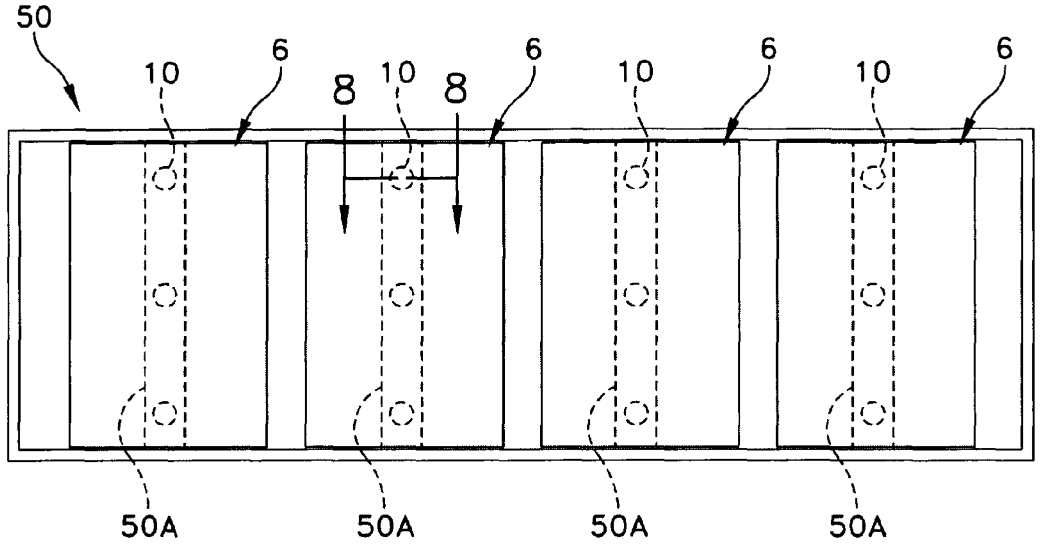
FIG. 7 illustrates the multiple foam panels of FIG. 6 placed within the steel form of FIG. 5.
Figure 8:
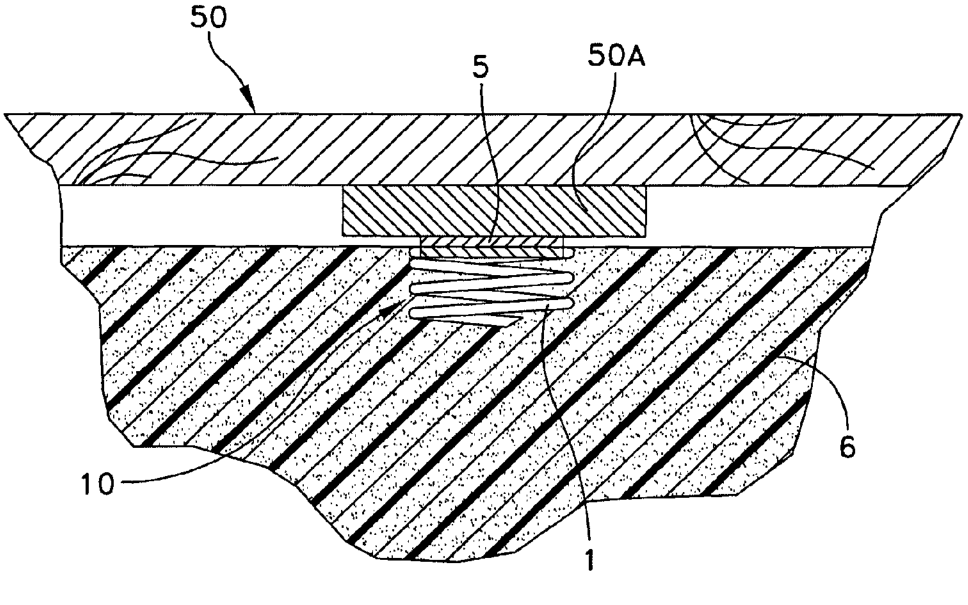
FIG. 8 illustrates the invention of FIG. 1 utilized to lock a foam panel onto a steel beam.

Referring to FIGS. 5 through 7, FIG. 5 illustrates a wall panel form including steel strips 50A at the base of the form. FIG. 6 illustrates the magnetic alignment tools 10 placed within the foam panels 6. As illustrated in FIGS. 7 and 8, the foam panels are then placed in the wall panel form 50 with the alignment tool 10 magnetic top surface 5A attaching to the steel strips 50A at the base of the form. The alignment tool keeps the foam panel 6 secured and stable within the form 50 while the form is being filled with concrete. After the concrete is poured and has cured the precast concrete enveloping the foam panel is separated from the form. The reduced magnetic strength of top surface 5A allows foam panel 6 and alignment tool 10 to easily detach from the steel form member 50A. The detachment is accomplished without pulling through the foam panel 6 and the alignment tool 10 can now be unscrewed from the foam panel 6. The precast concrete is next turned over, the alignment tool is removed, and the side which contained the alignment tool 10 is next filled with concrete to complete the precast concrete structure.

I claim:

1. A magnetic alignment tool for aligning inserts within a concrete form, comprising:

a baseplate having a top and bottom surface;

a gripping means extending outward from said baseplate bottom surface, said gripping means having a first and second end, said gripping means second end affixed to said baseplate bottom surface, said baseplate top surface comprising top surface screw means for screwing said gripping means into said inserts;

a magnet having a magnetic top surface and a magnetic bottom surface, wherein said magnetic top surface is less magnetized than said magnetic bottom surface, said magnet bottom surface magnetically affixed to said baseplate top surface, said magnet having an opening therethrough exposing said baseplate top surface screw means.

2. A magnetic alignment tool as in claim 1, wherein said gripping means first end is pointed.

3. A magnetic alignment tool as in claim 1, wherein said gripping means is a cylindrical coil.

4. A magnetic alignment tool as in claim 1, wherein said baseplate top surface further comprises a lip extending outward therefrom, said outward extending lip received within said magnet opening.

5. A magnetic alignment tool as in claim 4, wherein said lip and said magnet are substantially the same thickness and coplanar thereto.

6. A magnetic alignment tool as in claim 4, wherein said lip portion is concentric to said baseplate top surface, said concentric lip portion defining the periphery of said top surface screw means.

7. A magnetic alignment tool as in claim 6, wherein said top surface screw means is integrally molded within said concentric lip portion.

8. A magnetic alignment tool as in claim 1, wherein said magnetic top surface further includes a first and second magnetic surface, said first magnetic surface having a reduced magnetic strength compared to said second magnetic surface.

9. A magnetic alignment tool as in claim 8, wherein said first magnetic surface further includes an insulating coating, said insulating coating reducing the strength of said magnetic top surface.

10. A magnetic alignment tool for aligning inserts within a concrete form, comprising:

a baseplate having a top and bottom surface;

a gripping means extending outward from said baseplate bottom surface, said gripping means having a first and second end, said gripping means second end affixed to said baseplate bottom surface, said baseplate top surface comprising top surface screw means for screwing said gripping means into said inserts, said baseplate top surface further comprising a lip extending outward therefrom, said outward extending lip received within said magnet opening, said lip portion concentric to said baseplate top surface, said concentric lip portion defining the periphery of said top surface screw means, said screw means being a screw and nut;

a magnet having a magnetic top surface and a magnetic bottom surface, said magnet bottom surface magnetically affixed to said baseplate top surface, said magnet having an opening therethrough exposing said baseplate top surface screw means.

* * * * *